Feb. 14, 1956  J. E. MULHEIM ET AL  2,734,359
FLEXIBLE DRIVE MEANS

Filed July 14, 1951  2 Sheets-Sheet 1

WITNESSES:
Robert G. Baird
Wm. C. Groove

INVENTORS
Joseph E. Mulheim &
Scott B. Barnhardt.
BY
F. P. Lyle
ATTORNEY

Feb. 14, 1956    J. E. MULHEIM ET AL    2,734,359
FLEXIBLE DRIVE MEANS
Filed July 14, 1951    2 Sheets-Sheet 2

WITNESSES:
Robert A Baird
W. C. Groome

INVENTORS
Joseph E. Mulheim &
Scott B. Barnhardt.
BY
ATTORNEY

United States Patent Office 2,734,359
Patented Feb. 14, 1956

2,734,359

FLEXIBLE DRIVE MEANS

Joseph E. Mulheim and Scott B. Barnhardt, Lima, Ohio, assignors to Westinghouse Electric Corporation, East Pittsburgh, Pa., a corporation of Pennsylvania Application July 14, 1951, Serial No. 236,822

2 Claims. (Cl. 64—1)

The present invention relates to flexible drive means, and more particularly to a flexible drive or coupling for transmitting power to a driven shaft and for absorbing or reducing torsional vibration.

The flexible drive of the present invention is particularly suitable for use with dynamoelectric machines intended to be mounted on and driven by an internal combustion engine, such as aircraft generators, although it will be obvious that its usefulness is not limited to this specific application and that it may be used for driving any device where similar vibration problems are encountered.

Aircraft generators, which supply the electrical loads on airplanes, are usually mounted directly on a main engine of the airplane and driven from a power takeoff shaft geared to the engine crankshaft. Thus, if the generator shaft were rigidly connected to the driving shaft, the generator would be subjected to severe torsional vibration, because of the pulsating torque of an internal combustion engine. This torsional vibration may have a considerable amplitude over a relatively wide range of frequencies, and if the generator were rigidly connected to the drive shaft, it would obviously be subjected to severe vibratory stresses resulting from the torsional vibration. For this reason, it is necessary to provide a flexible drive means or coupling between the engine shaft and the generator shaft to absorb or materially reduce the torsional vibration. It is also necessary for the flexible drive to prevent any substantial amplification of the vibration by resonance effects between any frequency of the applied vibration and any natural frequency of the generator or of the drive. The flexible drive or coupling must also, of course, be highly reliable and of minimum size and weight since it is intended for aircraft use. It will be apparent that the design of a flexible drive meeting these requirements presents a rather difficult problem.

The principal object of the present invention is to provide an improved flexible drive means for transmitting power to a driven shaft and for absorbing or reducing torsional vibration transmitted to the driven shaft.

Another object of the invention is to provide a flexible drive, for transmitting power to a driven shaft, which has no resonant or critical frequency and which prevents any substantial amplification of the vibration by resonance effects.

A further object of the invention is to provide a flexible drive, for transmitting power to a driven shaft, in which the drive is connected to the driven shaft by resilient cushioning means which permits limited axial movement between the drive means and the shaft to prevent damage from axial shocks.

A more specific object of the invention is to provide a flexible drive which includes a torsionally resilient driving member, or spindle, extending through a hollow driven shaft and connected to the driven shaft at the end opposite the driven end of the spindle by a splined connection which has relatively large angular clearance between the engaging teeth, and which preferably also includes friction damping means opposing relative angular movement between the spindle and the shaft. It has been found that this combination of a torsionally resilient driving member and a splined connection with large angular clearance has unique response characteristics to torsional vibration and that the loose splined connection has a detuning effect which prevents any substantial amplification of the vibration. The friction damping is usually desirable to prevent any possibility of resonance under certain extreme conditions, although it may not always be necessary if there is sufficient damping, either mechanical or electrical, in the driven machine.

The invention will be more fully understood from the following detailed description, taken in connection with the accompanying drawings, in which.

Figure 1:
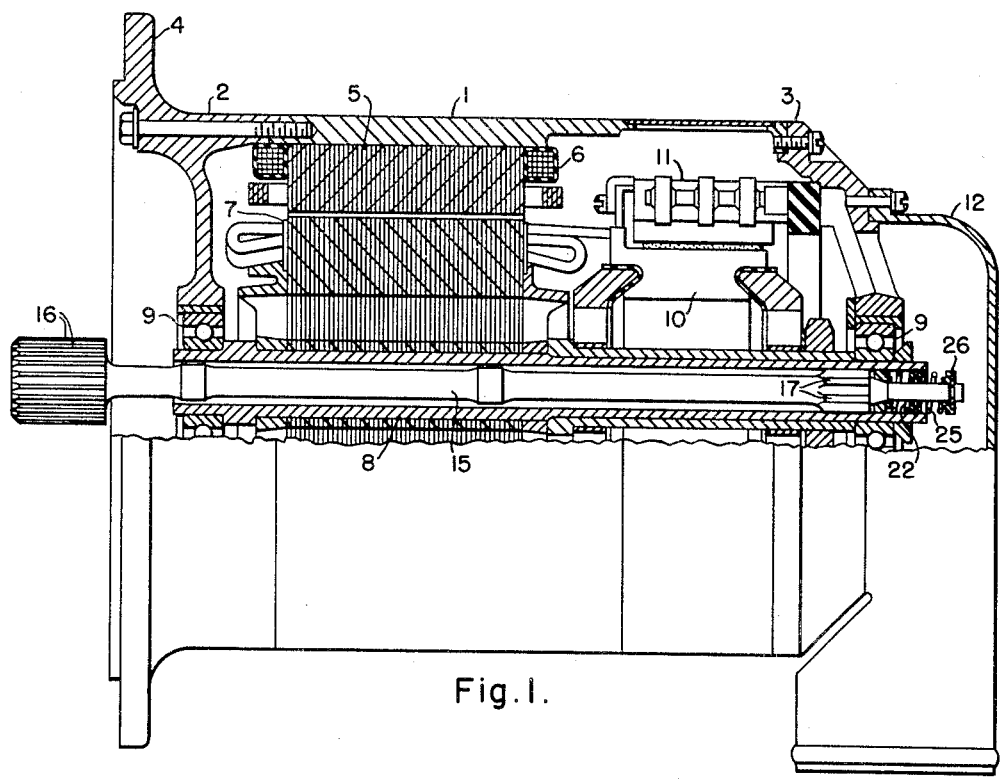
Figure 1 is a view, partly in longitudinal section and partly in elevation, of the flexible drive applied to an aircraft generator.
Figure 2:
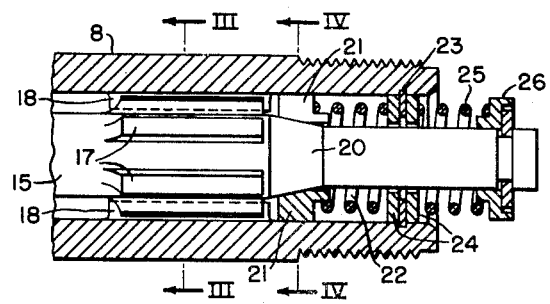
Fig. 2 is a longitudinal sectional view on an enlarged scale of one end of the flexible drive.

The invention is shown in Fig. 1 applied to a direct-current aircraft generator of more or less usual construction. The generator includes a generally cylindrical frame 1 closed at the ends by end brackets 2 and 3 of any suitable construction. The end bracket 2 is shown as having a mounting flange 4 for mounting the machine on an aircraft engine. Pole pieces 5 carrying field windings 6 are mounted in the frame 1, and an armature 7 of any suitable type is mounted on a hollow shaft 8 which is supported in ball bearings 9 in the end brackets 2 and 3. A commutator 10 is also mounted on the shaft 8 and suitable brushholders 11 are mounted on the end bracket 3 for supporting brushes in contact with the commutator 10. An air shield 12 may be secured to the end bracket 3 to permit blast cooling of the generator.

In use, aircraft generators of this type are mounted on an airplane main engine by means of the mounting flange 4 and driven by a drive shaft in the engine which is geared to the engine crankshaft. As pointed out above, the torsional vibration resulting from the pulsating torque of an internal combustion engine must be absorbed or reduced by a flexible driving connection between the engine drive shaft and the generator shaft 8. The flexible driving means of the present invention includes a torsionally resilient driving member, which is preferably an elongated spindle 15, extending longitudinally through the hollow generator shaft 8, and which is designed to have sufficient torsional resilience to absorb the vibration. The driven end of the spindle 15 extends out of the shaft 8 and is provided with spline teeth 16 for cooperation with corresponding splines in the engine drive shaft (not shown) to effect a driving connection to the spindle 15. The opposite end of the spindle 15, near the end of the shaft 8, is provided with spline teeth 17, and the generator shaft 8 is provided with internal spline teeth 18 for cooperation with the teeth 17 to effect a driving connection between the spindle 15 and the shaft 8.

Figure 3:
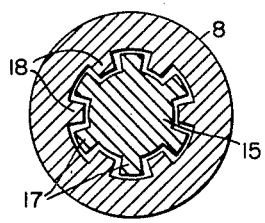
Fig. 3 is a transverse sectional view, approximately on the line III—III of Fig. 2.
Figure 4:
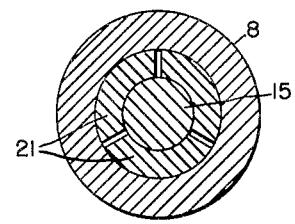
Fig. 4 is a transverse sectional view, approximately on the line IV—IV of Fig. 2.

As shown in Fig. 3, the co-operating spline teeth 17 and 18 are not designed in the conventional manner with close engagement, but are designed to have a relatively large angular clearance between them, so that there is a loose connection between the spindle and the shaft. The angular clearance between the teeth 17 and 18 is preferably of the order of 15°, although this value is not critical and may be varied over a reasonable range. It has been found that this combination of a torsionally resilient spindle, or driving member, and a loose splined connection, with large angular clearance between the teeth, has unique response characteristics to torsional vibration. The spindle absorbs and reduces the applied torsional vibration, because of its resilience, and the loose splined connection has a detuning effect which prevents any substantial amplification of the vibration by resonance effects. If the magnitude of the applied vibration is not unreasonably large, and if there is a reasonable amount of damping in the system, which may be either electrical or mechanical damping in the driven machine itself, the flexible drive has no noticeable critical or resonant frequency over a very wide range of frequencies, so that it is peculiarly suitable for applications such as the one described, where the applied torsional vibrations may have appreciable amplitudes over a wide frequency range.

In some instances, if there is insufficient damping in the system, it may be found that within a certain narrow frequency range, if the amplitude of the applied vibration is suddenly increased by a jolt or roughness of any kind, such as a backfire in the driving engine, the transmitted vibration may show a sudden undesirably large increase, due to the unloaded sides of the splines engaging each other. This effect does not occur if there is sufficient damping, and for this reason it is preferred to provide friction damping means in the drive to insure against the occurrence of this effect in cases where the driven machine may not include sufficient damping.

In the embodiment of the invention shown in Figs. 1 through 4, the damping means is provided adjacent the interengaging splines. The spindle 15 is provided with a tapered portion or conical shoulder 20 adjacent the teeth 17. A plurality of segmental friction shoes 21 are disposed around the spindle 15 engaging the shoulder 20, three shoes 21 preferably being used. The shoes 21 may be made of, or faced with, sintered bronze, or other suitable friction material, and are held against the shoulder 20 by a compression spring 22. The shaft 8 has an internal abutment means which may consist of a snap ring 23 engaging in a groove in the shaft, with washers 24 on each side of the ring 23, and the spring 22 is confined between the adjacent washer 24 and the friction shoes 21, so as to force them axially against the conical shoulder 20. A second compression spring 25 is disposed between the other washer 24 and an abutment member 26 of any suitable type engaging in a groove near the end of the spindle 15.

It will be seen that the spring 22 forces the shoes 21 against the conical shoulder 20, so that the shoes ride up on the shoulder into engagement with the internal surface of the shaft 8 and are firmly held against the shaft by the spring, so as to move with the shaft. Any relative rotational movement between the spindle 15 and the shaft 8, therefore, is opposed by the frictional engagement between the shoes 21 and the shoulder 20 on the spindle, so that such movement is damped and amplification of the vibration is substatnially prevented, as described above.

The opposed springs 22 and 25 acting between the shaft 8 and the spindle 15 form a resilient cushioning means for axially positioning the spindle in the shaft and for securing the spindle and shaft together. This resilient means, however, permits limited relative axial movement between the spindle and the shaft, so that danger of breakage of the spindle by axial shocks is prevented, since the spring means permits limited movement in response to such shocks and absorbs the energy without damage to the spindle.

Figure 5:
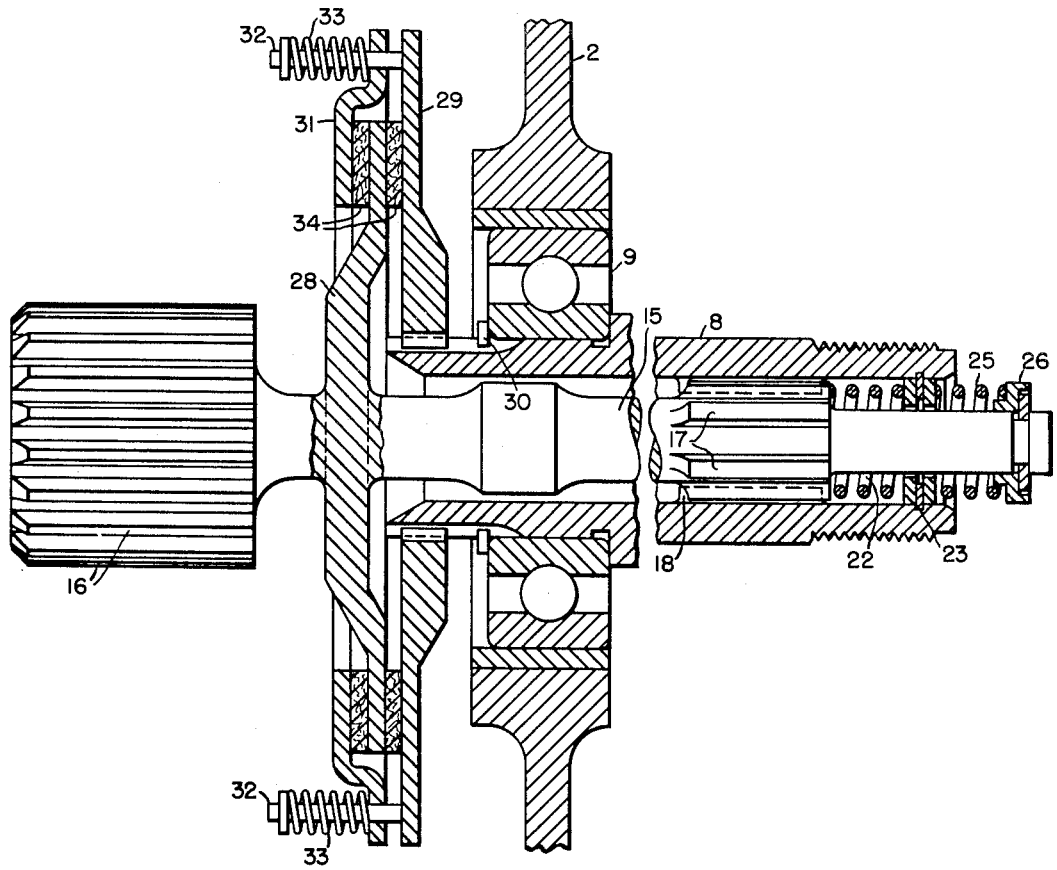
Fig. 5 is a longitudinal sectional view showing an alternative embodiment of the invention.

The frictional damping between the spindle 15 and shaft 8 may be provided in any desired manner and in any desired location. Thus, in the embodiment just described, the damping means is placed adjacent the splines 17 and 18 connecting the shaft and spindle. Fig. 5 shows another arrangement in which the damping means is provided adjacent the driven end of the spindle 15. The flexible drive shown in this figure is the same as previously described, and the corresponding elements are designated by the same reference numerals. The damping means in Fig. 5 includes a radial flange portion 28 formed integrally with the spindle 15 near the drive spline 16. A similar radial flange 29 of somewhat larger diameter is provided on the generator shaft 8 adjacent the flange 28 of the spindle 15. The flange 29 may be splined on the shaft 8 as shown, to permit the flange to move axially of the shaft, and a snap ring 30 may be utilized to retain the bearing 9 in place. An annular member 31 corresponding in outside diameter to the flange 29 is also provided, and is mounted on axial pins 32 which extend from the flange 29. Compression springs 33 are supported on the pins 32 for urging the annular member 31 towards the flange 29. The flange 28 of the spindle 15 extends radially between the flange 29 and member 31, and is faced on both sides with suitable friction material 34. It will be seen that the springs 33 force the member 31 and flange 29 into frictional engagement with the flange 28, and since the flange 28 moves with the spindle and the flange 29 moves with the shaft, relative movement of these members is frictionally opposed so that substantial damping is provided. In this embodiment of the invention, the opposing compression springs 22 and 25 at the opposite end of the spindle 15 are utilized only for the purpose of cushioning the spindle against axial shocks, as explained above, and since the conical shoulder is not required in this embodiment, the spring 22 may abut directly against the spline teeth 17.

It should now be apparent that a flexible drive means has been provided which is very effective in absorbing or reducing torsional vibration, and which prevents any substantial amplification of the applied vibration by resonance effects, because of the peculiar characteristics of the combination of a torsionally resilient spindle and a spline connection with large angular clearance. The construction of the flexible drive is relatively simple and inexpensive, and it is highly reliable, so that its characteristics are well suited for use with aircraft generators, although its usefulness is of course not limited to this particular application.

Certain specific embodiments of the invention have been shown and described for the purpose of illustration but it will be apparent that various modifications and other embodiments may be made, and it is to be understood, therefore, that the invention is not limited to the specific details of construction shown and described, but in its broadest aspects it includes all equivalent embodiments and modifications which come within the scope of the appended claims.

We claim as our invention:

1. In combination, a hollow driven shaft, a torsionally resilient spindle extending axially through said shaft, one end of the spindle extending out of the shaft and having means for effecting a driving connection to the spindle, spline teeth on the spindle adjacent the other end thereof within the shaft, internal spline teeth on the shaft engaging the teeth of the spindle to effect a driving connection, the engaging teeth having a relatively large angular clearance therebetween, the spindle having a conical shoulder adjacent said teeth, a plurality of friction shoes engaging the shoulder, and spring means urging said shoes axially against the shoulder to force them outward against the shaft to move with the shaft and to hold them in frictional engagement with the shoulder to oppose relative angular motion between the spindle and the shaft.

2. In combination, a hollow driven shaft, a torsionally resilient spindle extending axially through said shaft, one end of the spindle extending out of the shaft and having means for effecting a driving connection to the spindle, spline teeth on the spindle adjacent the other end thereof within the shaft, internal spline teeth on the shaft engaging the teeth of the spindle to effect a driving connection, the engaging teeth having a relatively large angular clearance therebetween, the spindle having a conical shoulder adjacent said teeth, a plurality of friction shoes engaging the shoulder, abutment means on the shaft, spring means engaging the abutment means and the friction shoes urging the friction shoes axially against the shoulder to force them outward against the shaft to move with the shaft and to hold them in frictional engagement with the shoulder, and spring means between the spindle and the shaft opposing the first-mentioned spring means.

References Cited in the file of this patent

UNITED STATES PATENTS

| | | |
|---|---|---|
| 1,287,030 | Jones | Dec. 10, 1918 |
| 1,965,742 | Junkers | July 10, 1934 |
| 2,437,954 | Havill | Mar. 16, 1948 |
| 2,590,169 | Fritz | Mar. 25, 1952 |
| 2,658,361 | Kalikow | Nov. 10, 1953 |

FOREIGN PATENTS

| | | |
|---|---|---|
| 302,625 | Great Britain | 1928 |